United States Patent
Mitsumori

(10) Patent No.: US 8,976,812 B2
(45) Date of Patent: Mar. 10, 2015

(54) COMMUNICATION APPARATUS AND BAND CONTROL METHOD

(71) Applicant: Fujitsu Limited, Kawasaki-shi (JP)

(72) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/717,868

(22) Filed: Dec. 18, 2012

(65) Prior Publication Data

US 2013/0215890 A1 Aug. 22, 2013

(30) Foreign Application Priority Data

Feb. 21, 2012 (JP) ................................. 2012-035655

(51) Int. Cl.
*H04J 3/22* (2006.01)
*H04L 12/24* (2006.01)
*H04L 12/46* (2006.01)

(52) U.S. Cl.
CPC .......... *H04L 41/0896* (2013.01); *H04L 12/465* (2013.01); *H04L 12/4654* (2013.01)
USPC ........................................................ 370/468

(58) Field of Classification Search
USPC ............... 370/468; 455/339, 441, 104, 188.1, 455/452.2
See application file for complete search history.

(56) References Cited

U.S. PATENT DOCUMENTS

2008/0010064 A1* 1/2008 Takeuchi et al. ............... 704/229
2013/0215890 A1* 8/2013 Mitsumori .................... 370/390

FOREIGN PATENT DOCUMENTS

JP 2007-214779 8/2007

* cited by examiner

*Primary Examiner* — Phuongchau Ba Nguyen
(74) *Attorney, Agent, or Firm* — Staas & Halsey LLP

(57) ABSTRACT

A communication apparatus includes: an attaching unit configured to attach, to an input frame to be processed in the communication apparatus, a frame identifier of the input frame and a band control correction value corresponding to the frame identifier and the output port; a correction unit configured to correct an amount of data of the frame to be output to a network via the output port, based on the band control correction value; a band control unit configured to control a band of each of the output ports, based on the amount of data of the frame corrected by the correction unit; and an editing unit configured to edit, according to the frame identifier, a frame that the attached frame identifier and correction value thereof has been removed from and that has been band controlled, the edited frame being output to the network via the output port.

10 Claims, 14 Drawing Sheets

LAN FRAME WITHOUT VLAN TAG (FRAME WITHOUT TAG)

LAN FRAME WITH VLAN TAG (VLAN TAG FRAME)

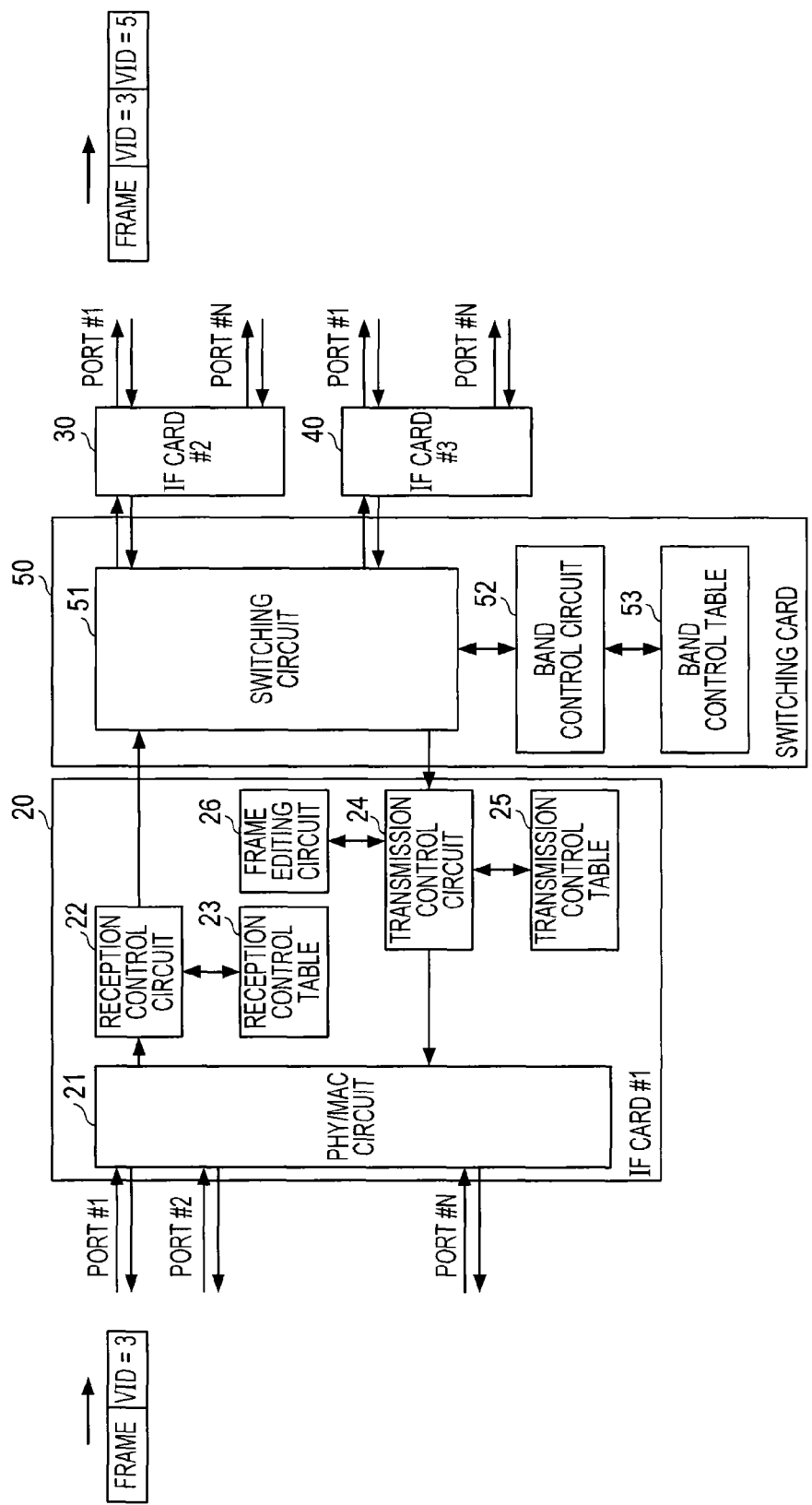

FIG. 5A

INDEX: SOURCE PORT NO. + VLAN ID:

| V | M | FID | CORRECTION VALUE | ... | DESTINATION IF CARD NO. | DESTINATION PORT NO. |
|---|---|-----|------------------|-----|-------------------------|----------------------|
| 1 | 0 | 50  | +32              | ... | IF CARD #2              | PORT #1              |

VID = 3

FIG. 5B

INDEX: DESTINATION PORT NO. + FID:

| EDIT CODE | VID TAG 1 | ... | VID TAG 2 |
|-----------|-----------|-----|-----------|
| 1 (ADDITION OF ONE STACK OF VLAN TAG) | VID = 5 | ... | UNUSED |

DESTINATION PORT #1 + FID = 50

FIG. 5C

INDEX: DESTINATION CARD NO. + DESTINATION PORT NO.:

| TRANSMISSION RATE (bps) | ... |
|-------------------------|-----|
| 100 Mbps                | ... |

DESTINATION CARD #2 + DESTINATION PORT #1:

FIG. 8A

INDEX: SOURCE PORT NO. + VLAN ID:

VID = 6

| V | M | FID | CORRECTION VALUE | DESTINATION IF CARD NO. | DESTINATION PORT NO. |
|---|---|-----|------------------|-------------------------|----------------------|
| 1 | 1 | 60  | UNUSED           | UNUSED                  | UNUSED               |

FIG. 8B

INDEX: DESTINATION PORT NO. + FID:

DESTINATION PORT NO. + FID = 60

| EDIT CODE | .. | VID TAG 1 | VID TAG 2 |
|-----------|----|-----------|-----------|
| 1 (ADDITION OF ONE STACK OF VLAN TAG) | .. | VID = 7 | UNUSED |

FIG. 8C

INDEX: DESTINATION PORT NO. + FID:

DESTINATION PORT NO. + FID = 60

| EDIT CODE | .. | VID TAG 1 | VID TAG 2 |
|-----------|----|-----------|-----------|
| 3 (DELETION OF ONE STACK OF VLAN TAG) | .. | UNUSED | UNUSED |

FIG. 8D

| INDEX: | TRANSMISSION RATE (bps) |
|---|---|
| DESTINATION CARD NO. + DESTINATION PORT NO.: | ... |
| DESTINATION CARD #2 + DESTINATION PORT #1: | 100 Mbps |
| DESTINATION CARD #3 + DESTINATION PORT #1: | 200 Mbps |
| ... | ... |

FIG. 8E

| INDEX: | IF CARD #1 | | | IF CARD #2 | | | IF CARD #3 | | | ... | IF CARD #N | | |
|---|---|---|---|---|---|---|---|---|---|---|---|---|---|
| FID: | PORT #1 | ... | PORT #N | PORT #1 | ... | PORT #N | PORT #1 | ... | PORT #N | ... | PORT #1 | ... | PORT #N |
| FID = 60 | 0/0 | ... | 0/0 | 1/+32 | ... | 0/0 | 1/-32 | ... | 0/0 | ... | 0/0 | ... | 0/0 |

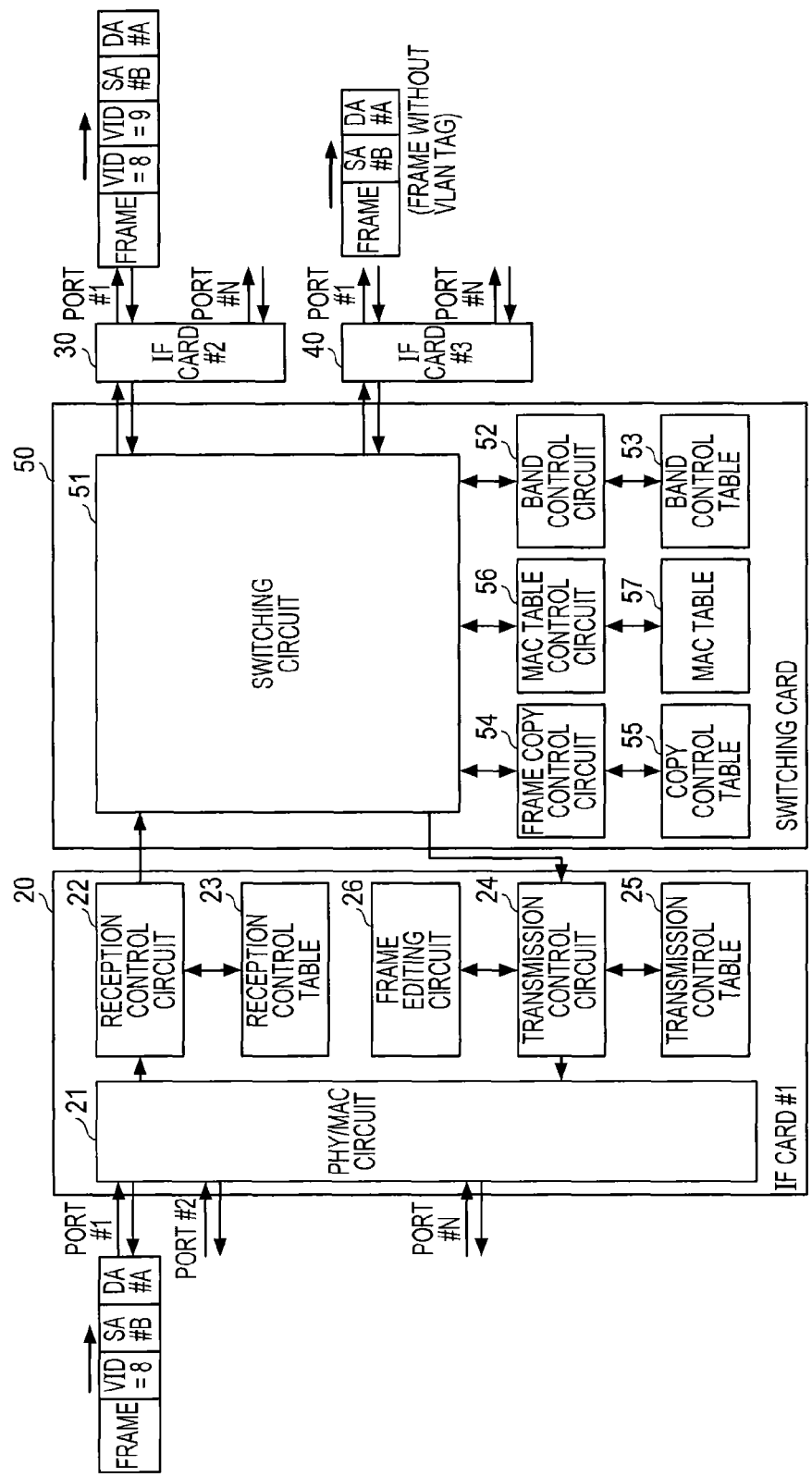

FIG. 10A

INDEX: SOURCE PORT NO. + VLAN ID: VID = 8

| V | M | FID | CORRECTION VALUE | DESTINATION IF CARD NO. | DESTINATION PORT NO. | LEARNING CORRECTION VALUE |
|---|---|---|---|---|---|---|
| 1 | 2 | 70 | UNUSED | UNUSED | UNUSED | +32 |

FIG. 10B

INDEX: DESTINATION PORT NO. + FID: DESTINATION PORT NO. + FID = 70

| EDIT CODE | VID TAG 1 | VID TAG 2 |
|---|---|---|
| 1 (ADDITION OF ONE STACK OF VLAN TAG) | VID = 8 | UNUSED |

FIG. 10C

INDEX: DESTINATION PORT NO. + FID: DESTINATION PORT NO. + FID = 70

| EDIT CODE | VID TAG 1 | VID TAG 2 |
|---|---|---|
| 2 (ADDITION OF ONE STACK OF VLAN TAG) | VID = 8 | VID = 9 |

FIG. 10D

INDEX: DESTINATION PORT NO. + FID: DESTINATION PORT NO. + FID = 70

| EDIT CODE | VID TAG 1 | VID TAG 2 |
|---|---|---|
| 0 (NOTHING DONE) | UNUSED | UNUSED |

FIG. 11A

| INDEX: | TRANSMISSION RATE (bps) |
|---|---|
| DESTINATION CARD NO. + DESTINATION PORT NO.: | : |
| DESTINATION CARD #1 + DESTINATION PORT #1: | 300 Mbps |
| DESTINATION CARD #2 + DESTINATION PORT #1: | 100 Mbps |
| DESTINATION CARD #3 + DESTINATION PORT #1: | 200 Mbps |
| : | : |

FIG. 11B

| INDEX: | IF CARD #1 | | | IF CARD #2 | | | IF CARD #3 | | | |
|---|---|---|---|---|---|---|---|---|---|---|
| FID: | PORT #1 | ... | PORT #N | PORT #1 | ... | PORT #N | PORT #1 | ... | PORT #N | |
| FID = 70 | 1/÷32 | ... | 0/0 | 1/÷64 | ... | 0/0 | 1/0 | ... | 0/0 | ... |
| | | | | | | | | | | ... |

FIG. 11C

INDEX: G

| | IF CARD NO. | IF PORT NO. | LEARNING CORRECTION VALUE |
|---|---|---|---|
| MAC ADDRESS: | | | |
| MAC = B | | | |
| 0 | INVALID | INVALID | INVALID |
| | .. | .. | |

FIG. 11D

INDEX: G

| | IF CARD NO. | IF PORT NO. | LEARNING CORRECTION VALUE |
|---|---|---|---|
| MAC ADDRESS: | | | |
| MAC = B | | | |
| 1 | IF CARD #1 | IF PORT #1 | +32 |
| | .. | .. | |

COMMUNICATION APPARATUS AND BAND CONTROL METHOD

CROSS-REFERENCE TO RELATED APPLICATION

This application is based upon and claims the benefit of priority of the prior Japanese Patent Application No. 2012-035655, filed on Feb. 21, 2012, the entire contents of which are incorporated herein by reference.

FIELD

The embodiments discussed herein are related to a communication apparatus and a band control method.

BACKGROUND

Along with the widespread use of the Internet and cell phones, carrier networks are shifting from time a division multiplexing (TDM) network, such as related art synchronous optical network/synchronous digital hierarchy (SONET/SDH), to a packet-based network, such as Ethernet (registered trademark) (hereinafter simply referred to as local area network (LAN)), employing LAN technique and Internet Protocol (IP) technique.

A communication company limits communication traffic to a contracted rate below which each user is permitted to transmit information to a network. To this end, the communication company requests a communication apparatus at a packet-based network of the communication company to control a transmission frame rate. The frame rate herein refers to an amount of data in a quantitative sense represented by unit, such as bit per second (bps).

In the packet-based network, in-frame information is referenced as an identifier to identify a user. The in-frame information includes virtual local area network (VLAN) tag, media access control (MAC) address, Internet protocol (IP) address, and multiprotocol label switching (MPLS) label. The identifier is not only checked against a reception frame and a transmission frame in an apparatus, but also newly attached to or deleted from the frame in the apparatus.

In such a case, a frame length of the reception frame or the transmission frame may be dynamically modified at a time point of input to or at a time point of output from the communication apparatus. Rate control of the transmission frame requested of the communication apparatus is performed so that frames externally transmitted from the communication apparatus, including a frame dynamically modified in frame length, are to be transmitted at a set upper rate or below.

FIG. 1 illustrates a configuration of an example of a network. Communication apparatuses 1a through 1f are mutually connected and form a network. The communication apparatus 1a is connected to user terminals 2a through 2i, and the communication apparatus 1d is connected to user terminals 3a through 3j. The communication terminal 1c is connected to user terminals 4a through 4k, and the communication terminal 1f is connected to user terminals 5a through 5m.

Each communication terminal receives a frame transmitted from a user terminal, and transfers the frame to an intended destination in accordance with address information or the like stored within the frame. For example, when the user terminal 2a transfers a LAN frame or an IP frame, the communication apparatus is performs a transfer process on the frame based on an MAC address stored in the LAN frame or an IP address stored in the IP frame. In the following discussion, a communication 1 represents each of the communication apparatuses 1a through 1f.

FIG. 2 is a block diagram of an example of the communication apparatus 1. The communication apparatus 1 includes network interface (IF) circuits 11-1 through 11-n, switch circuit 12, and control circuit 13. In the following discussion, a network IF circuit 11 represents each of the network IF circuits 11-1 through 11-n. As illustrated in FIG. 2, an arrow-headed solid line denotes a data line, and an arrow-headed broken line denotes a control line. Each network IF circuit 11 includes a network port (hereinafter simply referred to as "port"), and performs an interface process, a reception frame process, a transmission frame process and the like in conjunction with an external apparatus. The switch circuit 12 is connected to each network IF circuit 11 via the data line in the communication apparatus 1, and performs a switching process of a transfer frame in conjunction with the network IF circuit 11.

The control circuit 13 is connected to each network IF circuit 11 and the switch circuit 12 via the control lines in the communication apparatus 1, and controls a variety of settings of the network IF circuit 11 and the switch circuit 12 in the communication apparatus 1, and controls alarming, and collection of statistical information. The control circuit 13 is also connected to a control terminal 14 external to the communication apparatus 1. Each of the network IF circuits 11, the switch circuit 12, and the control circuit 13 may be supplied as a detachably mountable module or card, but optionally may be integrated with a mother board (mother card) of the communication apparatus 1.

FIGS. 3A and 3B illustrate formats of LAN frames. FIG. 3A illustrates a frame without a VLAN tag. FIG. 3B illustrates a frame with a VLAN tag. As illustrated in FIGS. 3A and 3B, MAC DA stands for a destination MAC address. MAC SA stands for a source MAC address. E-TYPE indicates a message type to be stored in a subsequent protocol data unit (PDU). For example, 0x0800 (0x represents a hexadecimal notation) indicates an Internet protocol version 4 (IPv4) frame. A message of an upper layer, such as IPv4 frame, is stored in PDU. Frame check sequence (FCS) is CRC-32 code for frame error detection.

Tag protocol ID (TPID) of FIG. 3 is an identifier that indicates that a virtual local area network ID (VLAN ID) is stored in a subsequent field, and typically the identifier is 0x8100 defined by IEEE802.1Q. VLAN ID is a VLAN ID value that identifies a user. TPID and VLAN ID are collectively referred to as a VLAN tag. A plurality of VLAN tags may be consecutively stacked.

Japanese Laid-open Patent Publication No. 2007-214779 discloses a data transfer technique. According to the disclosed data transfer technique, transfer type information is obtained by analyzing received communication data, a frame length of a transmission frame is predicted based on the transfer type information when the transmission frame is transferred, and a transmission band of communication data to be transferred is controlled in accordance with the predicted transmission frame length.

SUMMARY

According to an aspect of the invention, a communication apparatus that receives a frame input via an input port and outputs a frame via an output port, the communication apparatus includes: an attaching unit configured to attach, to the input frame to be processed in the communication apparatus, a frame identifier of the input frame and a band control correction value corresponding to the frame identifier and the output port; a correction unit configured to correct an amount of data of the frame to be output to a network via the output port, based on the band control correction value; a band control unit configured to control a band of each of the output ports, based on the amount of data of the frame corrected by the correction unit; and an editing unit configured to edit, according to the frame identifier, a frame that the attached frame identifier and correction value thereof has been removed from and that has been band controlled, the edited frame being output to the network via the output port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a block diagram illustrating a communication apparatus of a first embodiment;

FIGS. 5A through 5C illustrate a reception control table, a transmission control table, and a band control table, respectively;

FIGS. 8A through 8E illustrate a reception control table, a transmission control table, a band control table, and a copy control table;

FIG. 9 is a block diagram of a communication apparatus of a third embodiment;

FIGS. 10A through 10D illustrate a band control table and a transmission control table;

FIGS. 11A through 11D illustrate a band control table, a copy control table, and a MAC control table, respectively.

DESCRIPTION OF EMBODIMENTS

Figure 1:
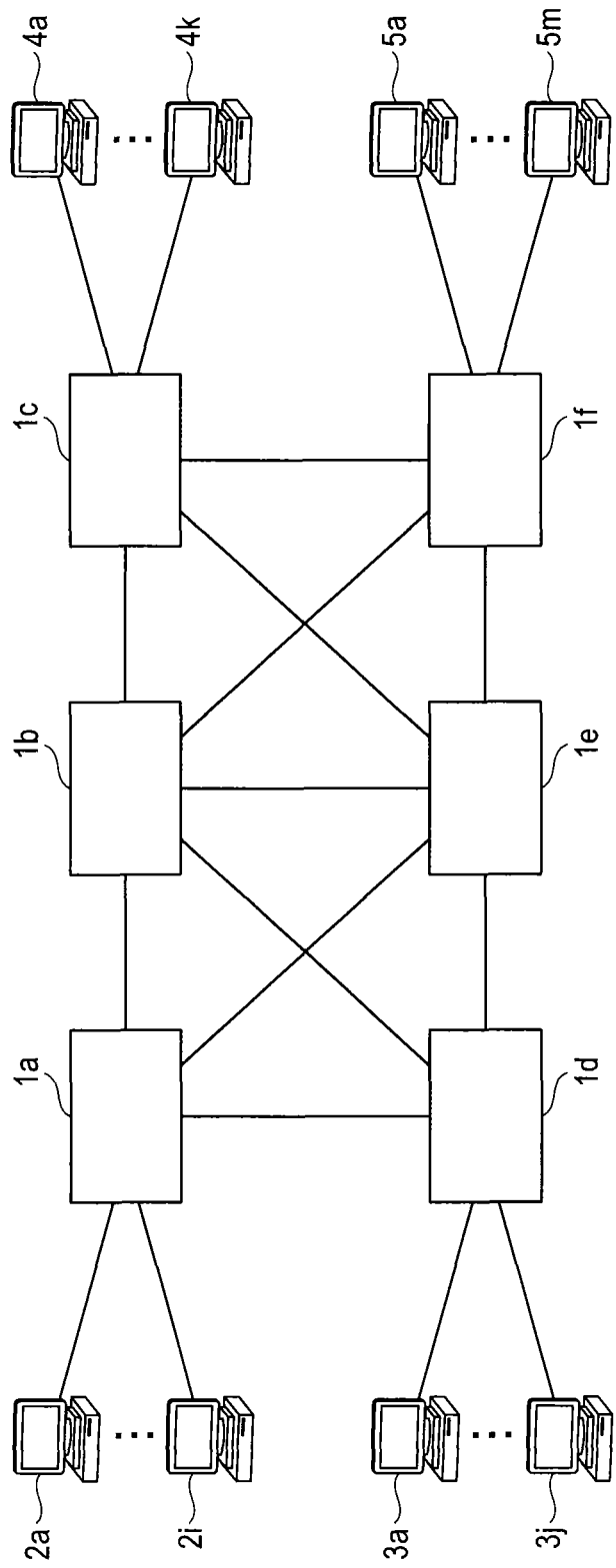
FIG. 1 illustrates a configuration of an example of a network.

A communication apparatus may include at a final stage of a band control circuit thereof a frame editing circuit that attaches or deletes user identification information, such as a VLAN tag, to or from a frame. The band control circuit controls a transmission rate of a frame. In such a case, a problem described below may be likely to occur. Since an amount of data of a frame that has undergone a transmission rate control process varies, it is difficult to correctly control a transmission rate of a frame to be transmitted from the communication apparatus.

If a communication apparatus includes a frame editing circuit at a front stage of the band control circuit, a problem described below may be likely to occur. Types of frames and applications supported by the communication apparatus have been diversified. For example, the frames include asynchronous transfer mode (ATM) cell, LAN frame, IP frame, MPLS frame, and provider backbone bridge (PBB) frame. Layer structure and process content of the frames, and an amount of and structure of data that are to be attached or deleted are different from frame type to frame type. For example, the VLAN tag in the LAN frame is 4 bytes per tag. The PBB frame has 16 bytes. In order to encapsulate a MAC frame of a provider in a MAC frame of a client, the PBB frame includes a destination MAC address (6 bytes), a transmission source MAC address (6 bytes), and the VLAN tag (4 bytes).

Each time a frame is received, the band control circuit checks an upper limit rate set for the destination, and an amount of data that are transmitted up until the present point of time. The band control circuit immediately determines that the upper limit rate is not exceeded if the frame is transmitted. The band control circuit then determines whether to transmit the frame. A complex operation is to be performed by the band control circuit. Along with an increase in a traffic amount of packet communications, a demand for faster processing speed is mounting on the band control circuit. Under these situations, the band control circuit tends to be a costly circuit.

In view of these problems, the band control circuit is implemented in a switch circuit rather than being implemented in each of network IF circuits. The switch circuit is a common portion of the communication apparatus and functions as a common circuit having greater versatility without paying particular attention to difference in frame type. This arrangement is effective in terms of costs and operability of the communication apparatus.

It is expected that new network applications will be developed from now on. A type of a frame to be processed in a network and an editing process on each frame may respond to such new network applications, and a new function is to be added easily to the communication apparatus. Considering the situation, an option described below is more advantageous in terms of costs and operability. More specifically, a new switching circuit having no band control circuit may be developed at low costs first, and later a band control circuit may be additionally implemented in accordance with a frame type and an application to be supported by the apparatus. Furthermore, development of an integrated circuit having greater versatility including a high-speed switching circuit and a band control circuit is contemplated for the communication apparatus. In such a case, the integrated circuit may be preferably developed as a general circuit that functions without paying any particular attention to a difference in frame type.

It is expected from the overview described above that more communication apparatuses include a frame editing circuit responsive to a frame type arranged at a final stage of a band control circuit that controls a rate of a transmission frame.

Embodiments of precisely controlling a transmission rate are described below with reference to the drawings.

First Embodiment

Figure 6:
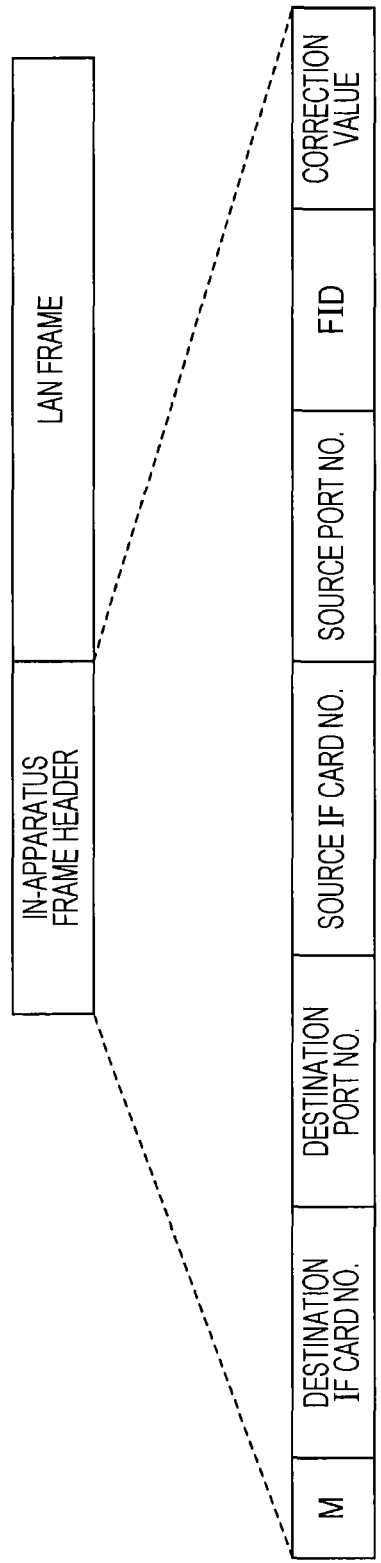
FIG. 6 illustrates a format of an in-apparatus frame.

FIG. 4 is a block diagram illustrating a communication apparatus of a first embodiment. FIGS. 5A through 5C illustrate a reception control table, a transmission control table, and a band control table, respectively. FIG. 6 illustrates a format of an in-apparatus frame transferred between an interface (IF) card and a switching card.

The communication apparatus of FIG. 4 transmits and receives a LAN frame with a VLAN tag. The communication apparatus includes IF cards 20, 30, and 40, and a switching card 50. The communication apparatus also includes a control card (illustrated in FIG. 2 but not illustrated in FIG. 4), and the control card is connected to a control terminal external to the communication apparatus. The IF cards 20, 30, and 40 are identical to each other in structure, and a port of each card is Gigabit Ethernet (registered trademark) interface and has a data rate of transmission and reception frames of 1 Gbps maximum. The IF cards 20, 30, and 40, and the switching card 50 are detachable cards. Alternatively, the F cards 20, 30, and 40, and the switching card 50 may be a unitary body integrated with a mother board of the communication apparatus.

A VLAN frame received at a network port of the IF card 20 is terminated at a physical/media access control (PHY/MAC) circuit 21, and then supplied to a reception control circuit 22. The reception control circuit 22 references the reception control table 23 by a reception port number and a VLAN ID (hereinafter referred to as VID) of a reception frame as an index.

The reception control table 23 of FIG. 5A stores, by a transmission source port number and a VID as an index, V bit, M bit, frame ID (FID), correction value, destination IF card number, and destination port number. The V bit indicates whether the VID is valid or invalid. If V=0, the VID is invalid, and if V=1, the VID is valid. The M bit indicates whether to multicast a received frame. If the number of transmission destinations of the received frame is one, the M bit is equal to 0 and indicates a unicast transfer. If the number of transmission destinations of the received frame is plural, the M bit is equal to 1, and indicates a static multicast transfer with point to multi points. If the M bit is equal to 2, the M bit indicates a multicast transfer of multi points to multi points, which is performed in domain service that is performed through MAC address learning. FID is an identifier of a frame to be processed by the communication apparatus, i.e., FID is a frame identifier. FID is used only within the communication apparatus. The correction value is used for band control, and a unit of the correction value is bit, for example.

If the V bit (valid bit) of the reception control table 23 is 0, the reception control circuit 22 discards the received frame for an invalid VID. If the V bit=1, the reception control circuit 22 retrieves the frame for a valid VID, and then transfers the retrieved frame to the switching card 50. The reception control circuit 22 then stores, in an in-apparatus frame header, the M bit, FID, the correction value, the destination IF card number, and the destination port number in the reception control table 23 excluding the V bit. FIG. 6 illustrates a format of an in-apparatus frame transferred between the IF card and the switching card.

The reception control circuit 22 stores the IF card number and the port number of the IF card having received a LAN frame at a transmission source IF card number and a transmission source port number in the in-apparatus frame header, respectively.

The IF card having received the LAN frame attaches to the LAN frame the in-apparatus frame header to form an in-apparatus frame. The in-apparatus frame is transferred to an IF card on a transmitter side via the switching card 50. The IF card on the transmitter side deletes the in-apparatus frame header from the in-apparatus frame, and the LAN frame is then output via a port to a network.

If the in-apparatus frame received by the switching card 50 has an in-apparatus frame header having M=0, the switching circuit 51 determines that the in-apparatus frame is to be unicast transferred. The in-apparatus frame is transferred to a destination card number of the in-apparatus frame header. The band control circuit 52 then performs a band control process on each of combinations of destination IF card number and destination port number. If a set transmission rate is exceeded, the band control circuit 52 discards the in-apparatus frame without transferring the in-apparatus frame to the IF card.

The band control circuit 52 performs the band control process on the transmission rate. The band control circuit 52 periodically references the band control table 53, and checks the upper limit value of the transmission rate on each of the combinations of transmission source IF card number and transmission source port number. The upper limit of the transmission rate is preset on the band control table 53 illustrated in FIG. 5C with the combination of transmission source IF card number and transmission source port number serving as an index.

The band control circuit 52 performs the band control process using a token packet method. For example, in 100 Mbps, tokens of 100 Mbits (for example, 1 token=1 bit) a second are periodically supplied, and accumulated on a token packet. When a frame is received, and then transmitted, an amount of data of the transmission frame (bit number) is subtracted from the token packet. If a subtraction operation results in 0 or less in the token packet, the amount of data is not subtracted from the tokens and the frame is discarded. In this way, the transmission frame is controlled not to exceed an upper limit value of 100 Mbps. Tokens are not accumulated in the token packet limitlessly, but a maximum cumulative amount is typically set on the token packet.

When the band control circuit 52 performs the band control process on the transmission frame, the band control circuit 52 adds a correction value stored in the in-apparatus frame header to the bit amount of the reception frame. A transmission control circuit 24 in each IF card having received the in-apparatus frame from the switching card 50 references a transmission control table 25 by the destination port number and FID in the in-apparatus frame header as an index.

On each of combinations of the destination port number and FID, an edit code for frame editing and VLAN tag information for addition setting are preset on the transmission control table 25 of FIG. 5B. For example, edit code=0 means that nothing is to be done, edit code=1 means that a single stack of VLAN tag is to be added, edit code=2 means that two stacks of VLAN tags are to be added, edit code=3 means that a single stack of VLAN tag is to be deleted, and edit code=4 means two stacks of VLAN tags are to be deleted.

A frame editing circuit 26 performs a frame editing process including adding a VLAN tag or deleting a VLAN tag in accordance with information of the transmission control table 25. The LAN frame processed by the frame editing circuit 26 is supplied to the transmission control circuit 24, then is transferred, via PHY/MAC circuit 21, to a port having a destination port number in the in-apparatus frame header.

According to the embodiment, the VLAN tag is an identifier of the frame. Alternatively, the VLAN tag may be substituted for by one of other identifiers including an MAC address, an IP address, and an MPLS label.

As illustrated in FIG. 4, a LAN frame of VID=3 received at port #1 of the IF card 20 is transferred to port #1 of the IF card 30 via the switching card 50. VID=5 is attached anew to the transmission frame, and is thus transmitted as a two-tag stacked VLAN frame.

The reception control table 23 of the IF card 20 includes items of contents of FIG. 5A. The transmission control table 25 of the IF card 30 includes items of contents of FIG. 5B. The band control table 53 of the switching card 50 includes items of contents of FIG. 5C.

As illustrated in FIG. 5A, 0 is set to the M bit in the reception control table 23 with respect to the frame to be unicast transferred. A common ID (=50) used in the unicast transfer is set to FID.

With the above setting, the frame editing circuit 26 in the IF card 30 attaches anew a VLAN tag with VID=5 to a LAN frame of VID=3 received at port #1 of the IF card 20, thereby increasing an amount of data of the frame by 32 bits. When the band control circuit 52 in the switching card 50 performs the band control process, 32 bits corresponding to the VLAN tag are added to the amount of data of the frame in accordance with the correction value attached to the in-apparatus frame header by the IF card 20. For this reason, the rate of the transmission frame output via port #1 of the IF card 30 does not exceed 100 Mbps.

If the frame editing circuit 26 is present at a stage subsequent to the band control circuit 52, the in-apparatus frame with the band control correction value in the in-apparatus frame header is transferred. In this way, the band control circuit 52 performs correction control in view of an increase or decrease in the data amount caused by a subsequent frame editing circuit. The band control circuit 52 may perform the band control process precisely on the LAN frame transmitted from the communication apparatus.

Furthermore, the in-apparatus frame header including FID used only within the communication apparatus is attached to the received frame. The switching circuit 51 and the band control circuit 52 in the switching card 50 may thus be developed as a common portion having greater versatility without paying particular attention to frame type difference, such as the LAN frame (with or without VLAN tag), IP frame, and MPLS frame. A dedicated IF card may be developed to process a frame of a different frame type, or of a different layer structure.

Second Embodiment

Figure 7:
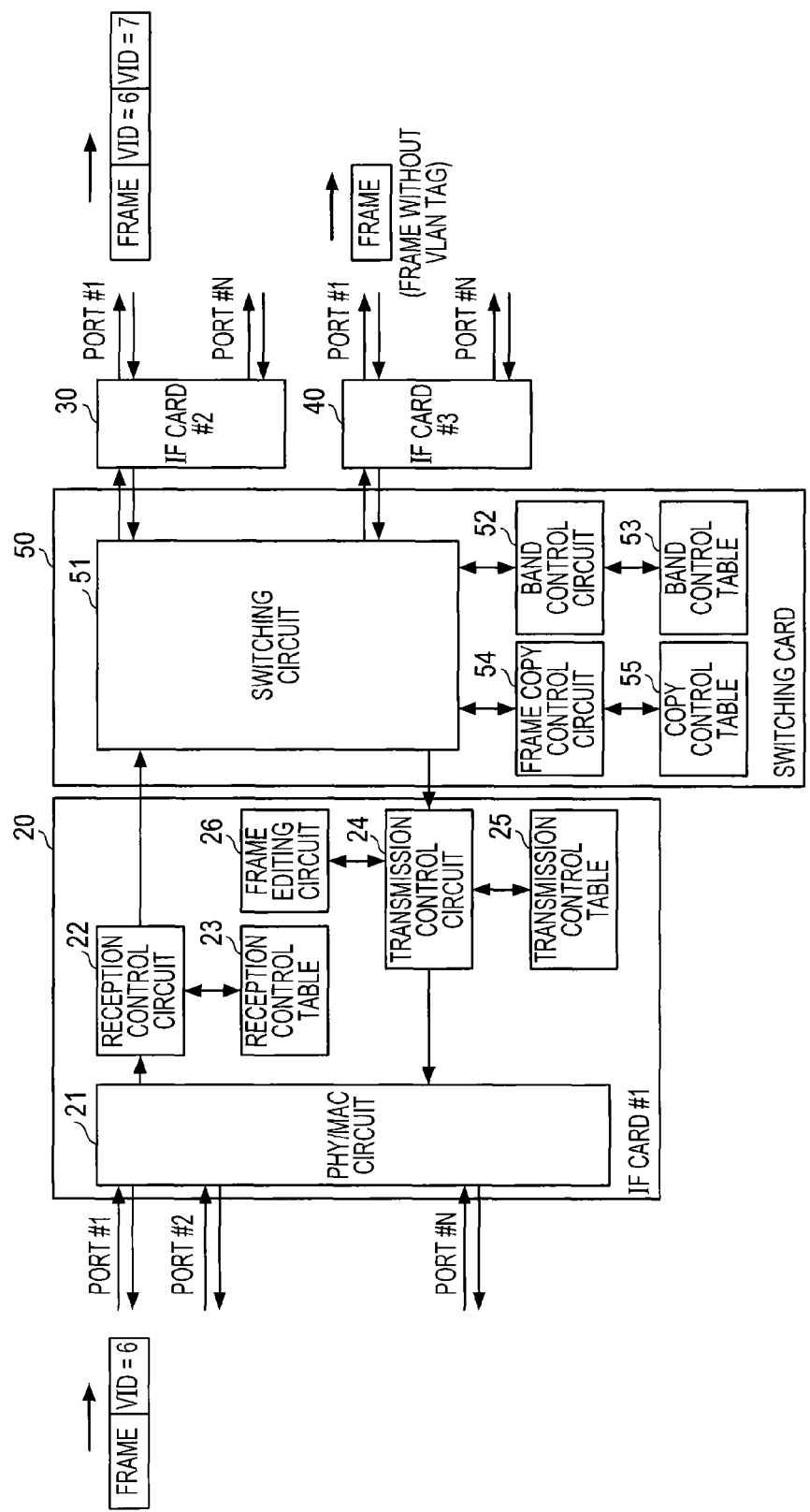
FIG. 7 is a block diagram of a communication apparatus of a second embodiment.

FIG. 7 is a block diagram of a communication apparatus of a second embodiment. FIGS. 8A through 8E illustrate a reception control table, a transmission control table, a band control table, and a copy control table.

In the second embodiment, a band correction control process is performed for multicast transfer in the communication apparatus. The IF card 20, the IF card 30, and the IF card 40 in the second embodiment are identical in configuration to the counterparts in the first embodiment. Not that the switching card 50 includes a frame copy control circuit 54 and a copy control table 55 in addition to the switching circuit 51, the band control circuit 52, and the band control table 53.

The communication apparatus of FIG. 7 transmits and receives a LAN frame with a VLAN tag. The communication apparatus includes the IF cards 20, 30, and 40, and the switching card 50. The communication apparatus also includes a control card (not illustrated) that is the same as the control card of FIG. 2, and is connected to a control terminal external to the communication apparatus.

The IF cards 20, 30, and 40 are identical to each other in structure, and a port of each card is Gigabit Ethernet (registered trademark) interface and has a data rate of transmission and reception frames of 1 Gbps maximum. The IF cards 20, 30, and 40, and the switching card 50 are detachable cards. Alternatively the F cards 20, 30, and 40, and the switching card 50 may be a unitary body integrated with a mother board of the communication apparatus.

A VLAN frame received at a network port of the IF card 20 is terminated at the physical/media access control (PHY/MAC) circuit 21, and then supplied to the reception control circuit 22. The reception control circuit 22 references the reception control table 23 by a reception port number and a VID of a reception frame as an index.

The reception control table 23 of FIG. 8A stores, by a transmission source port number and a VID as an index, V bit, M bit, FID, correction value, destination IF card number, and destination port number. The V bit indicates whether the VID is valid or invalid. If V=0, the VID is invalid, and if V=1, the VID is valid. The M bit indicates whether to multicast a received frame. If the number of transmission destinations of the received frame is one, the M bit is equal to 0 and indicates a unicast transfer. If the number of transmission destinations of the received frame is plural, the M bit is equal to 1, and indicates a static multicast transfer with point to multi points. If the M bit is equal to 2, the M bit indicates a multicast transfer of multi points to multi points, which is performed in domain service that is performed through MAC address learning. FID is an identifier of a frame to be processed by the communication apparatus, i.e., FID is a frame identifier. FID is used only within the communication apparatus. If the M bit is 1, the correction value, the destination IF card number, and the destination port number remain unused.

If the V bit (valid bit) of the reception control table 23 is 0, the reception control circuit 22 discards the received frame for an invalid VID. If the V bit=1, the reception control circuit 22 retrieves the frame for a valid VID, and then transfers the retrieved frame to the switching card 50. The reception control circuit 22 then stores, in an in-apparatus frame header, the M bit, and FID in the reception control table 23 excluding the V bit. FIG. 6 illustrates a format of an in-apparatus frame transferred between the IF card and the switching card.

The reception control circuit 22 stores the IF card number and the port number of the IF card having received a LAN frame at a transmission source IF card number and a transmission source port number in the in-apparatus frame header, respectively.

The IF card having received the LAN frame attaches to the LAN frame the in-apparatus frame header to form an in-apparatus frame. The in-apparatus frame is transferred to an IF card on a transmitter side via the switching card 50. The IF card on the transmitter side deletes the in-apparatus frame header from the in-apparatus frame, and the LAN frame is then output via a port to the network.

If the in-apparatus frame received by the switching card 50 has an in-apparatus frame header having M=1, the switching circuit 51 determines that the in-apparatus frame is to be multicast transferred. The in-apparatus frame is copied under the control of the frame copy control circuit 54 as described below, and the resulting copy is transferred. The band control circuit 52 performs the band control process on each of combinations of destination IF card number and destination port number. If a set transmission rate is exceeded, the band control circuit 52 discards the in-apparatus frame without transferring the in-apparatus frame to the IF card.

The band control circuit 52 performs the band control process on the transmission rate. The band control circuit 52 periodically references the band control table 53, and checks the upper limit value of the transmission rate on each of the combinations of transmission source IF card number and transmission source port number. The upper limit of the transmission rate is preset on the band control table 53 illustrated in FIG. 8D with the combination of transmission source IF card number and transmission source port number serving as an index.

The band control circuit 52 performs the band control process using a token packet method. For example, in 100 Mbps, tokens of 100 Mbits (for example, 1 token=1 bit) a second are periodically supplied, and accumulated on a token packet. When a frame is received, and then transmitted, an amount of data of the transmission frame (bit number) is subtracted from the token packet. If a subtraction operation results in 0 or less in the token packet, the amount of data is not subtracted from the tokens and the frame is discarded. In this way, the transmission frame is controlled not to exceed an upper limit value of 100 Mbps. Tokens are not accumulated in the token packet limitlessly, but a maximum cumulative amount is typically set on the token packet.

When the band control circuit 52 performs the band control process on the transmission frame, the band control circuit 52 sums not only the bit amount of the reception frame but also a correction value stored in the in-apparatus frame header. The transmission control circuit 24 in each IF card having received the in-apparatus frame from the switching card 50 references the transmission control table 25 by the destination port number and FID in the in-apparatus frame header as an index.

On each of combinations of the destination port number and FID, an edit code for frame editing and VLAN tag information for addition setting are preset on the transmission control table 25 of FIGS. 8B and 8C. For example, edit code=0 means that nothing is to be done, edit code=1 means that a single stack of VLAN tag is to be added, edit code=2 means that two stacks of VLAN tags are to be added, edit code=3 means that a single stack of VLAN tag is to be deleted, and edit code=4 means two stacks of VLAN tags are to be deleted.

The frame editing circuit 26 performs a frame editing process including adding a VLAN tag or deleting a VLAN tag in accordance with information of the transmission control table 25. The LAN frame processed by the frame editing circuit 26 is supplied to the PHY/MAC circuit 21. The LAN frame processed by the frame editing circuit 26 is supplied to the transmission control circuit 24, then is transferred, via PHY/MAC circuit 21, to a port having a destination port number in the in-apparatus frame header.

If the M bit in the in-apparatus frame header is "1" when the in-apparatus frame is received, the switching circuit 51 in the switching card 50 determines that the frame is to be multicast, and starts up the frame copy control circuit 54. The frame copy control circuit 54 references the copy control table 55 by the IF card number and the port number as an index.

The copy control table 55 of FIG. 8E includes a setting field for each port of each IF card. Set in each field are the presence or absence of a frame copy, and a band control correction value for a frame subsequent to copying. In an X/Y format in each setting field, X represents the presence or absence of the frame copy, and the value 0 represents the absence of the frame copy, and the value 1 represents the presence of the frame copy. If the value 1 is set in X, the destination card number and the destination port number in the in-apparatus frame header in the in-apparatus frame subsequent to copying are updated to the card number and the port number in the copy control table 55. Y represents the band control correction value to the in-apparatus frame subsequent to copying.

As illustrated in FIG. 7, a LAN frame with VID=6 received at port #1 of the IF card 20 is multicast in the communication apparatus, thus transferred to port #1 of the IF card 30 and port #1 of the IF card 40. A tag with VID=7 is newly added to the frame transmitted to port #1 of the IF card 30. A tag VID=6 is deleted from the frame transmitted to port #1 of the IF card 40.

As illustrated in the reception control table 23 of FIG. 8A, "1" is set to the M bit in the multicast transfer frame. A common ID (=60) used in the same multicast transfer is set to FID. A status "unused" is set to the destination IF card and the destination port number because no destination is decided yet at this point of time. Also, since no destination is decided yet, the status "unused" is set to the band control correction value.

The transmission control table 25 of the IF card 30 includes items of contents of FIG. 8B. The transmission control table 25 of the IF card 40 includes items of contents of FIG. 8C. The band control table 53 of the switching card 50 includes items of contents of FIG. 8D. The copy control table 55 of the switching card 50 includes items of contents of FIG. 8E. The band control table 53 indicates different settings of the transmission rate, i.e., a transmission rate of 100 Mbps for destination port #1 of a destination card #2, and a transmission rate of 200 Mbps for destination port #1 of a destination card #3.

In this case, the frame copy control circuit 54 references the copy control table 55 by FID of the in-apparatus frame header as an index. The copy control table 55 includes information that is used to copy the in-apparatus frame with FID=60. In the copy control table 55 of FIG. 8E, port #1 of the IF card 30 (#2) and port #1 of the IF card 40 (#3) are set as output destinations. The frame copy control circuit 54 performs the copy process. In the copy process, the destination IF card number, the destination port number, and the band control correction value of the copy control table 55 are set in the in-apparatus frame header of the copied in-apparatus frame.

Subsequent to frame copying, a 32 bit value corresponding to an added VLAN tag with VID=7 is added to the amount of frame data of the in-apparatus frame addressed to port #1 of the IF card 30. The band control circuit 52 then performs the band control process so that the transmission rate does not exceed 100 Mbps. A 32 bit value corresponding to a deleted VLAN tag with VID=6 is subtracted from the amount of frame data of the frame addressed to port #1 of the IF card 40. The band control circuit 52 thus performs the band control process so that the transmission rate does not exceed 200 Mbps.

According to the second embodiment, to multicast a frame within the communication apparatus, the frame is copied, a band control correction value is added to the copied frame as an in-apparatus frame, and the in-apparatus frame is then multicast transferred. Precise band control is thus performed on the LAN frame transmitted from each port of the communication apparatus.

Third Embodiment

Figure 12:
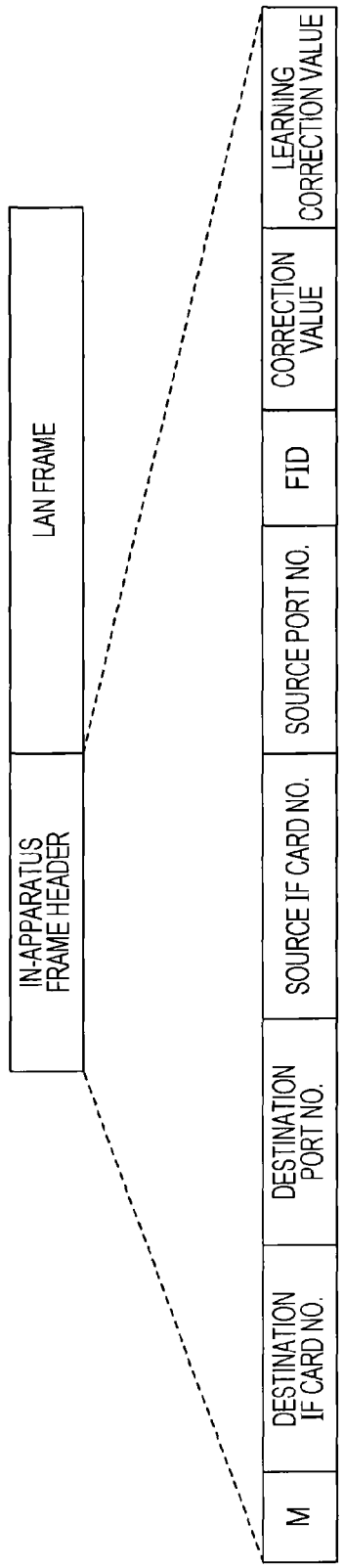
FIG. 12 illustrates a format of an in-apparatus frame.

FIG. 9 is a block diagram of a communication apparatus of a third embodiment. FIGS. 10A through 10D illustrate a band control table and a transmission control table. FIGS. 11A through 11D illustrate a band control table, a copy control table, and a MAC control table. FIG. 12 illustrates a format of an in-apparatus frame transferred between the IF card and the switching card.

A bridge apparatus learns a transmission source MAC address of a LAN frame together with the transmission source card number and the transmission source port number into a MAC table. When the LAN frame having the MAC address as a destination MAC address is received, the bridge apparatus determines a destination of the received LAN frame from content learned from the MAC table. Since the bridge apparatus determines the destination by learning the content in the MAC table, it is difficult to set the band control correction value in the table beforehand as in the first and second embodiments.

In the third embodiment, band correction control is preformed on a multi-point service where the MAC address is learned (i.e., in a multicast transfer of multi points to multi points). The IF cards 20, 30, and 40 in the third embodiment are identical in structure to the counterparts in the first embodiment, but note that the switching card 50 includes a MAC table control circuit 56 and a MAC table 57 in addition to the switching circuit 51, the band control circuit 52, the band control table 53, the frame copy control circuit 54, and the copy control table 55.

The communication apparatus of FIG. 9 transmits and receives a LAN frame with a VLAN tag. The communication apparatus includes the IF cards 20, 30, and 40, and the switching card 50. The communication apparatus also includes a control card (not illustrated) that is the same as the control card of FIG. 2, and is connected to a control terminal external to the communication apparatus.

The IF cards 20, 30, and 40 are identical to each other in structure, and a port of each card is Gigabit Ethernet (registered trademark) interface and has a data rate of transmission and reception frames of 1 Gbps maximum. The IF cards 20, 30, and 40, and the switching card 50 are detachable cards. Alternatively the F cards 20, 30, and 40, and the switching card 50 may be a unitary body integrated with a mother board of the communication apparatus.

A VLAN frame received at a network port of the IF card 20 is terminated at the physical/media access control (PHY/MAC) circuit 21, and then supplied to the reception control circuit 22. The reception control circuit 22 references the reception control table 23 by a reception port number and a VID of a reception frame as an index.

The reception control table 23 of FIG. 10A stores, by a transmission source port number and a VID as an index, V bit, M bit, FID, correction value, destination IF card number, and destination port number. The V bit indicates whether the VID is valid or invalid. If V=0, the VID is invalid, and if V=1, the VID is valid. The M bit indicates whether to multicast a received frame. If the number of transmission destinations of the received frame is one, the M bit is equal to 0 and indicates a unicast transfer. If the number of transmission destinations of the received frame is plural, the M bit is equal to 1, and indicates a static multicast transfer with point to multi points. If the M bit is equal to 2, the M bit indicates a multicast transfer of multi points to multi points, which is performed in domain service that is performed through MAC address learning. FID is an identifier of a frame to be processed by the communication apparatus, i.e., FID is a frame identifier. FID is used only within the communication apparatus. The learning correction value is used for learning band control, and a unit of the learning correction value is bit, for example. If the M bit is 2, the correction value, the destination IF card number, and the destination port number remain unused.

If the V bit (valid bit) of the reception control table 23 is 0, the reception control circuit 22 discards the received frame for an invalid VID. If the V bit=1, the reception control circuit 22 retrieves the frame for a valid VID, and then transfers the retrieved frame to the switching card 50. The reception control circuit 22 then stores, in an in-apparatus frame header, the M bit, FID, and learning correction value in the reception control table 23 excluding the V bit. FIG. 12 illustrates a format of an in-apparatus frame transferred between the IF card and the switching card.

The reception control circuit 22 stores the IF card number and the port number of the IF card having received a LAN frame at a transmission source IF card number and a transmission source port number in the in-apparatus frame header, respectively. The reception control circuit 22 further stores a learning band control correction value at the learning correction value of the in-apparatus frame header.

The IF card having received the LAN frame attaches to the LAN frame the in-apparatus frame header to form an in-apparatus frame. The in-apparatus frame is transferred to an IF card on a transmitter side via the switching card 50. The IF card on the transmitter side deletes the in-apparatus frame header from the in-apparatus frame, and the LAN frame is then output via a port to the network.

If the in-apparatus frame received by the switching card 50 has an in-apparatus frame header having M=2, the switching circuit 51 determines that the in-apparatus frame is to be multicast transferred. The in-apparatus frame is copied under the control of the frame copy control circuit 54 as described below, and the resulting copy is transferred. The band control circuit 52 performs the band control process on each of combinations of destination IF card number and destination port number. If a set transmission rate is exceeded, the band control circuit 52 discards the in-apparatus frame without transferring the in-apparatus frame to the IF card.

The band control circuit 52 performs the band control process on the transmission rate. The band control circuit 52 periodically references the band control table 53, and checks the upper limit value of the transmission rate on each of the combinations of transmission source IF card number and transmission source port number. The upper limit of the transmission rate is preset on the band control table 53 illustrated in FIG. 11A with the combination of transmission source IF card number and transmission source port number serving as an index.

The band control circuit 52 performs the band control process using a token packet method. For example, in 100 Mbps, tokens of 100 Mbits (for example, 1 token=1 bit) a second are periodically supplied, and accumulated on a token packet. When a frame is received, and then transmitted, an amount of data of the transmission frame (bit number) is subtracted from the token packet. If a subtraction operation results in 0 or less in the token packet, the amount of data is not subtracted from the tokens and the frame is discarded. In this way, the transmission frame is controlled not to exceed an upper limit value of 100 Mbps. Tokens are not accumulated in the token packet limitlessly, but a maximum cumulative amount is typically set on the token packet.

When the band control circuit 52 performs the band control process on the transmission frame, the band control circuit 52 sums not only the bit amount of the reception frame but also a correction value stored in the in-apparatus frame header. The transmission control circuit 24 in each IF card having received the in-apparatus frame from the switching card 50 references the transmission control table 25 by the destination port number and FID in the in-apparatus frame header as an index.

On each of combinations of the destination port number and FID, an edit code for frame editing and VLAN tag information for addition setting are preset on the transmission control table 25 of FIGS. 10B, 10C and 10D. For example, edit code=0 means that nothing is to be done, edit code=1 means that a single stack of VLAN tag is to be added, edit code=2 means that two stacks of VLAN tags are to be added, edit code=3 means that a single stack of VLAN tag is to be deleted, and edit code=4 means two stacks of VLAN tags are to be deleted.

The frame editing circuit 26 performs a frame editing process including adding a VLAN tag or deleting a VLAN tag in accordance with information of the transmission control table 25. The LAN frame processed by the frame editing circuit 26 is supplied to the transmission control circuit 24, then is transferred, via PHY/MAC circuit 21, to a port having a destination port number in the in-apparatus frame header.

If the M bit in the in-apparatus frame header is "1" when the in-apparatus frame is received, the switching circuit 51 in the switching card 50 determines that the frame is to be multicast, and starts up the frame copy control circuit 54. The frame copy control circuit 54 references the copy control table 55 by the IF card number and the port number as an index.

The copy control table 55 of FIG. 11B includes a setting field for each port of each IF card. Set in each field are the presence or absence of a frame copy, and a band control correction value for a frame subsequent to copying. In an X/Y format in each setting field, X represents the presence or absence of the frame copy, and the value 0 represents the absence of the frame copy, and the value 1 represents the presence of the frame copy. If the value 1 is set in X, the destination card number and the destination port number in the in-apparatus frame header in the in-apparatus frame subsequent to copying are updated to the card number and the port number in the copy control table 55. Y represents the band control correction value to the in-apparatus frame subsequent to copying.

As illustrated in FIG. 9, a LAN frame having a destination MAC address (labeled DA) #A, a transmission source MAC address (labeled SA) #B, and VID=8 is received via port #1 of the IF card 20, and port #1 of the IF card 30 and port #1 of the IF card 40 are flooded with the LAN frame.

A VLAN tag with VID=9 is newly added to a frame to be transmitted via port #1 of the IF card 30. A VLAN tag with VID=8 is deleted from a frame to be transmitted via port #1 of the IF card 40, and the frame is thus transmitted without VLAN tag. The transmission source MAC address #B is learned from the MAC table 57 of the switching card 50.

As illustrated in FIG. 10A, M=2 is set in the reception control table 23 with respect to a multi point service LAN frame as a MAC address learning target. The M bit equal to 2 indicates a service, such as the multi point service, where the MAC address learning is to be performed. A learning correction value is set in the reception control table 23. A common ID (=70), which is used in the same multi point server, is set for FID. The learning correction value is a correction value that is applied when a frame having that VID is output from a reception port. The learning correction value is newly additionally set to the in-apparatus frame header as illustrated in FIG. 12.

The VLAN tag is deleted from the multi point service frame when the multi point service frame is received, and a frame without VLAN tag is then transferred within the communication apparatus. A frame format of the multi point service frame having a plurality of input points is consistently used in the communication apparatus so that the band control process of the switching card 50 and the frame editing process of the transmitter side IF card are thus facilitated. When the frame with VID=8 is received, the VLAN tag of the frame is deleted by the IF card 20.

When the IF card 20 receives an in-apparatus frame with FID=70 from the switching card 50, and then transfers the in-apparatus frame to port #1 thereof, VID=8 is attached to the in-apparatus frame. As illustrated in the reception control table 23 of FIG. 10A, +32 is set for the learning correction value.

When the switching card 50 receives a frame with M=2, the MAC table control circuit 56 references the MAC table 57 by the transmission source MAC address of the received frame as an index.

The MAC table 57 of FIGS. 11C and 11D stores a learning flag G, IF card number, IF port number, and learning correction value by the MAC address as an index. The learning flag G=0 indicates an unlearned state, and the port serves as a target of flooding. The learning flag G=1 indicates a learned state. The IF card number and port number learned are stored for the destination IF card number and the destination port number in the in-apparatus frame header. This in-apparatus frame is transmitted to the IF card of the destination IF card number.

In the embodiment, the switching card 50 receives the in-apparatus from the IF card 20, and then determines whether the transmission source MAC address #B has been learned. At this point of time, however, the MAC address #B has not been learned, and the IF card number, the IF port number, and the learning correction value in the MAC table 57 are invalid as illustrated in FIG. 11C.

Since the switching circuit 51 floods ports of IF cards with the received frame, the frame copy control circuit 54 references the copy control table 55 by FID in the in-apparatus frame header as an index.

Information used to copy a frame with FID=70 is stored in the copy control table 55. Three ports, i.e., port #1 of the IF card 20 (#1), port #1 of the IF card 30 (#2), and port #1 of the IF card 40 (#3), are set as output destinations in the copy control table 55 of FIG. 11B. The frame copy control circuit 54 performs the copy process. In the copy process, the destination ID card number, the destination port number, and the band control correction value of the copy control table 55 are set in the in-apparatus frame header of the copied in-apparatus frame.

The frame copy control circuit 54 compares "the destination card number and the destination port number" with "the transmission source card number and the transmission source port number." If the two pairs of numbers match, the frame copy control circuit 54 does not perform the copy process. This arrangement controls a retransmission of the received frame to the transmission source port.

The band control circuit 52 and the band control table 53 perform the band correction control process on the copied LAN frame intended for the IF card 30 and the IF card 40 in accordance with the correction value set in the copy control table 55. An accurate transmission rate is thus assured.

Concurrently, the MAC table control circuit 56 learns the transmission source MAC address #B of the frame into the MAC table 57. The transmission source card number, the transmission source port number, and the learning correction value in the in-apparatus frame header are learned together into the MAC table 57. The MAC table 57 includes contents of FIG. 11D. The MAC table control circuit 56 performs an aging process on the MAC table 57 periodically. The aging process is an update process on which the data corresponding to the transmission source MAC address is deleted in the case that the frame with the transmission source MAC address has not been received at intervals of an aging time.

After the MAC address #B is learned, a LAN frame with two stacks of VLAN tags with VID=9 and VID=8 having the destination MAC address #B may be received via port #1 of the IF card 30. The two stacks of VLAN tags with VID=9 and VID=8 are deleted from the frame, and a resulting frame without VLAN tag is transferred to the switching card 50.

The switching card 50 reads the MAC table 57 by the MAC address #B as an index. Since the MAC address #B has been learned, contents of FIG. 11D written on the MAC table 57 are read. The in-apparatus frame of FIG. 11D is transferred to port #1 of the IF card 20 (#1) without being flooded. The learning correction value (=+32) of FIG. 11D is set for the band control correction value or the learning correction value in the in-apparatus frame header of the frame, and is then supplied to the band control circuit 52 as a band control correction value.

The band control circuit 52 performs the band correction by adding +32 as the learning correction value of the MAC table 57 of FIG. 11D to the amount of data of the frame. Even if a LAN frame with a VLAN tag with VID=8 attached thereto is output via port #1 of the IF card 20, an accurate transmission rate is assured.

Even in the multi point service where the MAC address is to be learned, a correction value that accounts for a predicted format of a frame to be transmitted is set beforehand as learning information, and is learned in conjunction with the learning of the MAC address. An accurate transmission rate is thus assured through the band correction control.

Fourth Embodiment

Figure 3A:
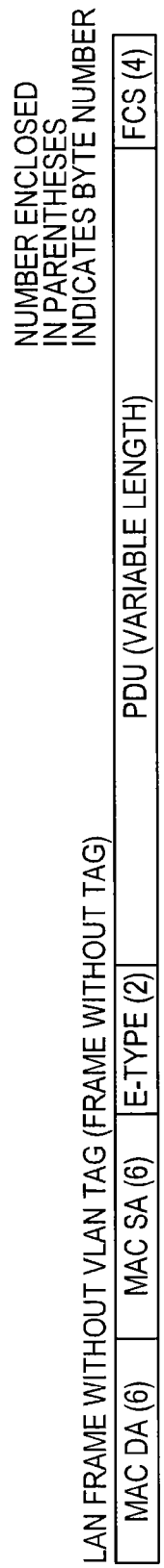
FIGS. 3A and 3B illustrate formats of an LAN frame.
Figure 3B:

When a LAN frame of FIGS. 3A and 3B is transferred over a transmission line, a minimum inter-frame gap of 20 bytes takes place between frames. A user or an operator, who operates a network, may wish to account for the gap in band calculation. In such a case, a correction value to be set in each table of FIG. 9 may include a gap of +20 bytes.

Figure 2:
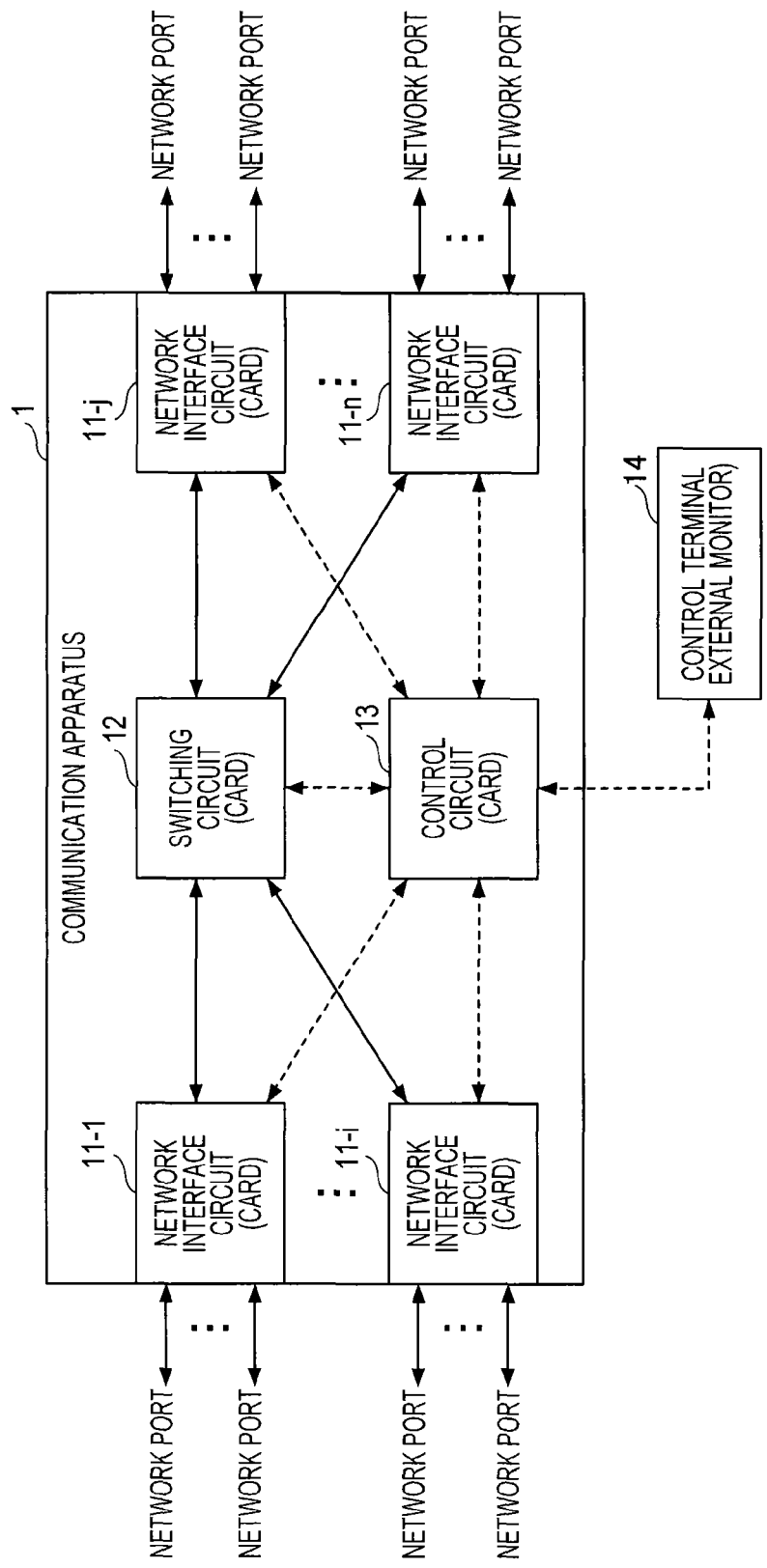
FIG. 2 is a block diagram illustrating an example of a communication apparatus.

In the first through third embodiments, the control card in the communication apparatus automatically calculates the correction value in accordance with setting content as to whether the VLAN tag is attached or deleted, and then sets the resulting correction value. In the fourth embodiment, the user or the network operator sets any correction value. More specifically, from the control terminal 14 connected to the control card as illustrated in FIG. 2, the operator inputs any correction value for each of the IF card number, the port number, and the VID using a usable command. The control card then sets the band control correction value in the reception control table 23, the copy control table 55, and the MAC table 57. Any correction value may be set from outside the communication apparatus, and the band control appropriate for the network specifications is thus performed.

The communication apparatus including the frame editing circuit arranged at the final stage of the band control circuit performs an accurate transmission rate control to each of the frame transferred, and may provide improved performance and reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus that receives a frame input via an input port and outputs a frame via an output port, the communication apparatus comprising:
an interface card, from among of a plurality of interface cards, configured to:
a frame identifier and a band control correction value corresponding to the frame identifier and the output port to the input frame; and
a switch card configured to:
correct an amount of data of the frame to be output to a network via the output port, based on the band control correction value;
control a band of the output port, based on the corrected amount of data of the frame; and
edit, according to the frame identifier, a frame that the attached frame identifier and correction value thereof has been removed from and that has been band controlled, the edited frame being output to the network via the output port.

2. The communication apparatus according to claim 1, wherein the interface card is further configured to:
store, in a first storage, the frame identifier of the input frame, and the band control correction value corresponding to the frame identifier and the output port; and
attach the frame identifier and band control correction value read from the first storage to the input frame.

3. The communication apparatus according to claim 2, wherein the switch card is further configured to:
store, in a second storage, band control correction values respectively for a plurality of output ports for the frame to be transferred in a multicast mode; and
when the input frame is to be transferred in the multicast mode, copy the frame on a per output port basis and attach to the copied frame a band control correction value on the second storage.

4. The communication apparatus according to claim 3, wherein the switch card is further configured to:
attach a learning correction value used for address learning and band control to a frame targeted for address learning;
store, in a third storage, the learning correction value together with port information of a port that has received the frame targeted for the address learning;
when the input frame is to be transferred using the port information on the third storage and attach to the input frame a learning correction value on the third storage; and
correct an amount of data of the frame to be output to the network via the output port, based on the learning correction value.

5. The communication apparatus according to claim 4, wherein the switch card is further configured to:
set band control correction values to be stored on the first storage, and the second storage, and learning correction values to be stored on the third storage, based on outside control.

6. A band control method of a communication apparatus that receives a frame input via an input port and outputs a frame via an output port, the band control method comprising:
attaching a frame identifier and a band control correction value corresponding to the frame identifier and the output port to the input frame;
correcting an amount of data of the frame to be output to a network via the output port, based on the band control correction value;
controlling a band of the output port, based on the amount of data of the corrected frame; and
editing, according to the frame identifier, a frame that the attached frame identifier and correction value thereof has been removed from and that has been band controlled, and outputting the edited frame to the network via the output port.

7. The band control method according to claim 6, further comprising:
storing, on a first storage, the frame identifier of the input frame, and a band control correction value corresponding to the frame identifier and the output port,
wherein the frame identifier and the band control correction value are read from the first storage and then attached to the frame.

8. The band control method according to claim 7,
storing, on a second storage, band control correction values respectively for a plurality of output ports for the frame to be transferred in a multicast mode;

when the input frame is to be transferred in the multicast mode,
copying the frame on a per output port basis;
attaching to the copied frame a band control correction value on the second storage; and
correcting the amount of data of the frame to be output to the network via the output port, based on the band control correction value.

9. The band control method according to claim 8, further comprising:
attaching, to a frame targeted for address learning, a learning correction value used for address learning and band control;
storing, on a third storage, the learning correction value together with port information of a port that has received the frame targeted for the address learning;
attaching, when the input frame is to be transferred using the port information on the third storage, to the input frame a learning correction value on the third storage; and
correcting an amount of data of the frame to be output to the network via the output port, based on the learning correction value.

10. The band control method according to claim 9, further comprising:
setting band control correction values stored on the first storage, and the second storage, and learning correction values stored on the third storage, based on outside control.

* * * * *

UNITED STATES PATENT AND TRADEMARK OFFICE
CERTIFICATE OF CORRECTION

PATENT NO.        : 8,976,812 B2
APPLICATION NO.   : 13/717868
DATED             : March 10, 2015
INVENTOR(S)       : Yasuyuki Mitsumori It is certified that error appears in the above-identified patent and that said Letters Patent is hereby corrected as shown below:

In the Claims

Column 15, Line 54, in Claim 1, delete "a frame identifier" and insert -- attach a frame identifier --, therefor.

Signed and Sealed this
Twenty-first Day of July, 2015

Michelle K. Lee
*Director of the United States Patent and Trademark Office*